US008711548B2

(12) United States Patent
Cavazos et al.

(10) Patent No.: US 8,711,548 B2
(45) Date of Patent: Apr. 29, 2014

(54) AUTOMATIC ACTUATOR FOR BREAKERS OR SWITCHES

(75) Inventors: Marcel Montemayor Cavazos, Guadalupe (MX); Jose Enrique Parra Ortiz, Monterrey (MX)

(73) Assignee: Schneider Electric USA, Inc., Palatine, IL (US)

( * ) Notice: Subject to any disclaimer, the term of this patent is extended or adjusted under 35 U.S.C. 154(b) by 120 days.

(21) Appl. No.: 13/495,759

(22) Filed: Jun. 13, 2012

(65) Prior Publication Data

US 2013/0335888 A1 Dec. 19, 2013

(51) Int. Cl.
*H02B 1/04* (2006.01)
*H01H 77/00* (2006.01)

(52) U.S. Cl.
USPC .................. 361/632; 200/331; 335/6; 335/14

(58) Field of Classification Search
USPC .......................................................... 361/632
See application file for complete search history.

(56) References Cited

U.S. PATENT DOCUMENTS

| | | | | |
|---|---|---|---|---|
| 5,341,273 | A | 8/1994 | Sharp et al. | 361/641 |
| 6,326,870 | B1 | 12/2001 | Larranaga et al. | 335/68 |
| 6,522,227 | B1 | 2/2003 | Mody et al. | 335/14 |
| 6,963,042 | B1 * | 11/2005 | Kouris | 200/400 |
| 7,280,013 | B2 * | 10/2007 | Lewis | 335/6 |
| 7,498,535 | B2 | 3/2009 | Blake et al. | 200/331 |
| 2004/0149555 | A1 | 8/2004 | Jordan | 200/400 |

OTHER PUBLICATIONS

Square D: Schneider Electric. “POWERLINK G3™: Lighting Control Systems, Class 1210.” 2002 (28 pages).
Square D: Schneider Electric. Brochure: “Ready When the Lights Go Out—Back-Up Power Solutions.” 2006 (2 pages).
Schneider Electric. Overview of “Intelligent Load Centers.” [online] [retrieved on Aug. 23, 2012]. Retrieved from the Internet:<URL: http://products.schneider-electric.us/products-services/products/load-centers/residential/intelligent-load-centers/>.

* cited by examiner

*Primary Examiner* — Gregory Thompson
(74) *Attorney, Agent, or Firm* — Locke Lord LLP

(57) ABSTRACT

A load center includes a housing, a cover, and a circuit breaker. The load center can be retrofitted to further include a rotational motor, an actuator member, and a guide insert. The rotational motor includes a threaded drive shaft positioned through an aperture formed in the cover. The actuator member is threadingly engaged with the threaded drive shaft. The actuator member is oriented relative to the cover such that a handle of the circuit breaker is positioned through an aperture of the actuating member. Rotation of the threaded drive shaft causes the actuator member to translate such that a first actuating surface of the actuator member engages the handle and switches the handle from an OFF position to an ON position. The handle of the circuit breaker has full range of travel between the ON and OFF positions in response to the actuator member being moved into a neutral position.

20 Claims, 11 Drawing Sheets

AUTOMATIC ACTUATOR FOR BREAKERS OR SWITCHES

FIELD OF THE INVENTION

The present invention relates generally to electrical equipment and, more particularly, to electrical enclosures having automatic actuators.

BACKGROUND OF THE INVENTION

Electrical enclosures, such as, for example, load centers or panelboards, typically house multiple circuit breakers and/or related electrical accessories. Load centers typically include one main feeder bar or busbar per phase of electricity to be distributed to a protected load. Load centers include an outer housing that limits the space available for installing circuit breakers and related electrical equipment therein.

Some prior art load centers are intelligent load centers that include one or more remotely controlled circuit breakers. Each of the remotely controlled circuit breakers includes components within its housing (i.e., the housing of the circuit breaker) to provide a remotely controlled ON/OFF operation of a protected load (e.g., lighting fixtures). One such product is, for example, a POWERLINK® G3 Remotely Operated Circuit Breaker, provided by Schneider Electric USA, Inc. The housings of such remotely controllable circuit breakers are designed to be installed into load centers with specific dimensions such that, for example, electrical distribution and supply wires have a sufficient amount of space and clearance therein (e.g., in the wire gutter(s) of the load center). Thus, such remotely controllable circuit breakers cannot necessarily be installed in and/or be retrofitted into load centers of all sizes. For example, load centers with dimensions for receiving circuit breakers having relatively smaller housings without additional components therein to provide a remote ON/OFF feature (e.g., miniature circuit breakers such as the QO® one-pole standard circuit breaker and the HOMELINE® one-pole standard circuit breaker, both provided by Schneider Electric USA, Inc.). Additionally, as the remotely controllable circuit breakers include various components within their respective housings that tend to have limited space, the remote mechanisms are complex and can cause such circuit breakers to be relatively more expensive than circuit breakers without such remote mechanisms (e.g., approximately ten times more expensive).

Thus, a need exists for an improved apparatus and method. The present disclosure is directed to satisfying one or more of these needs and solving other problems.

SUMMARY OF THE INVENTION

The present disclosure is directed towards retrofitting a previously installed load center. In the case where it is desired to provide remote control and/or operation of a load center that includes a multitude of previously purchased and installed circuit breakers, the present disclosure provides a load center with one or more actuator assemblies that can be retrofitted into the load center to provide such remote operation via, for example, one or more communication devices (e.g., router, controller, processor, computer, etc., or any combination thereof).

The actuator assembly includes a rotational motor and an actuator member. The motor is attached to the cover (e.g., via screws) of the load center such that a threaded drive shaft of the motor extends through an aperture (e.g., a drive-shaft aperture) in, and perpendicular to, a flange of the cover. On the other side of the flange, the actuator member is threadingly coupled to the threaded drive shaft (e.g., screwed onto the drive shaft). Installation of additional actuator assemblies is completed for each circuit breaker in the load center desired to be remotely controlled.

The cover is replaced onto a housing of the load center such that the actuator members are positioned adjacent to respective ones of the circuit breakers. Each actuator member includes an aperture (e.g., a handle aperture) that, when the cover is replaced onto the housing, receives the handle of its corresponding circuit breaker therethrough. Remote control of the circuit breakers is accomplished by the motors rotating the threaded drive shafts which causes the actuator member to move. Movement of the actuator member in one direction pulls the handle and causes the handle to switch the circuit breaker from OFF to ON. Similarly, movement of the actuator member in an opposite direction pushes the handle and causes the handle to switch the circuit breaker from ON to OFF.

After remote operation of the circuit breakers, the actuator assemblies return to a home or neutral position. In the neutral position, the actuator member does not obstruct the handle of the circuit breaker in any manner such that the circuit breaker has a full range of travel (without motor control). That is, an operator of the load center can manually touch and switch the circuit breaker from ON to OFF or vice versa without use of the motor and/or actuator member when the actuator member is in the neutral position. Similarly, during operation of the load center, in the case of an electrical event that causes the circuit breaker to trip, thereby causing the handle to move from the ON position to a TRIPPED position, the actuator member does not obstruct the handle of the circuit breaker in any manner such that the circuit breaker has a full range of travel (without motor control) from the ON position to the TRIPPED position when the actuator member is in the neutral position.

The present disclosure further provides an additional aperture (e.g., a trip-indicating aperture) in the actuator member such that the actuator member does not obstruct a visual trip indicator of the circuit breaker when the actuator member is in the neutral position.

Installation of the actuator assemblies of the present disclosure into a load center allows for the individualized and/or collective remote control of the circuit breakers therein. That is, each of the circuit breakers can be remotely controlled (e.g., switched from ON to OFF) one-at-a-time, and/or all at the same time, via a multitude of actuator assemblies (e.g., one actuator assembly for each circuit breaker). Such a collective control of the circuit breakers adds safety to operation of load centers as circuits can be switched OFF without having to wait for the switching of adjacent circuits.

The foregoing and additional aspects and embodiments of the present disclosure will be apparent to those of ordinary skill in the art in view of the detailed description of various embodiments and/or aspects, which is made with reference to the drawings, a brief description of which follows.

BRIEF DESCRIPTION OF THE DRAWINGS

The foregoing and other advantages of the present disclosure will become apparent upon reading the following detailed description and upon reference to the drawings.

DETAILED DESCRIPTION OF THE ILLUSTRATED EMBODIMENTS

Figure 1:
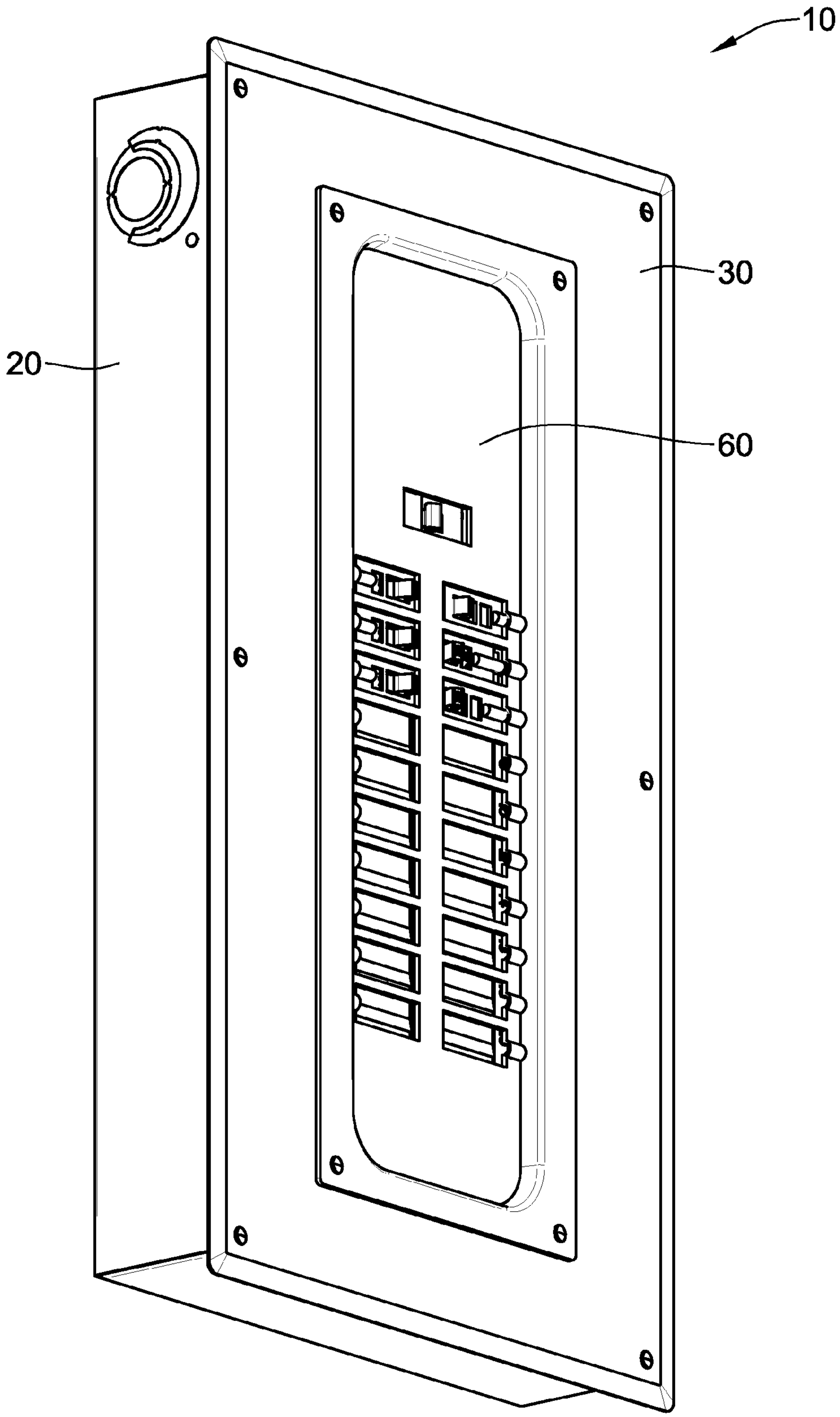
FIG. 1 is a perspective view of a load center according to some aspects of the present disclosure.

Referring to FIG. 1, a load center or a panelboard 10 includes a housing 20, a cover 30, and optionally a guide insert 60. The housing 20 can be made of a variety of materials including metal, plastic, fiberglass, and the like, or any combination thereof. The housing 20 can include a hinged door (not shown) or other means of sealing and/or covering all of, or some of, the contents of the load center 10. The housing 20 can include an insulating pad (not shown) that covers all of or a portion of an interior surface of the housing 20. The insulating pad (not shown) is configured to electrically insulate the contents of the load center 10 from electrically conductive items outside the housing 20 (e.g., metal wall studs, screws, wires, etc.) and/or the housing 20 itself.

Figure 2:
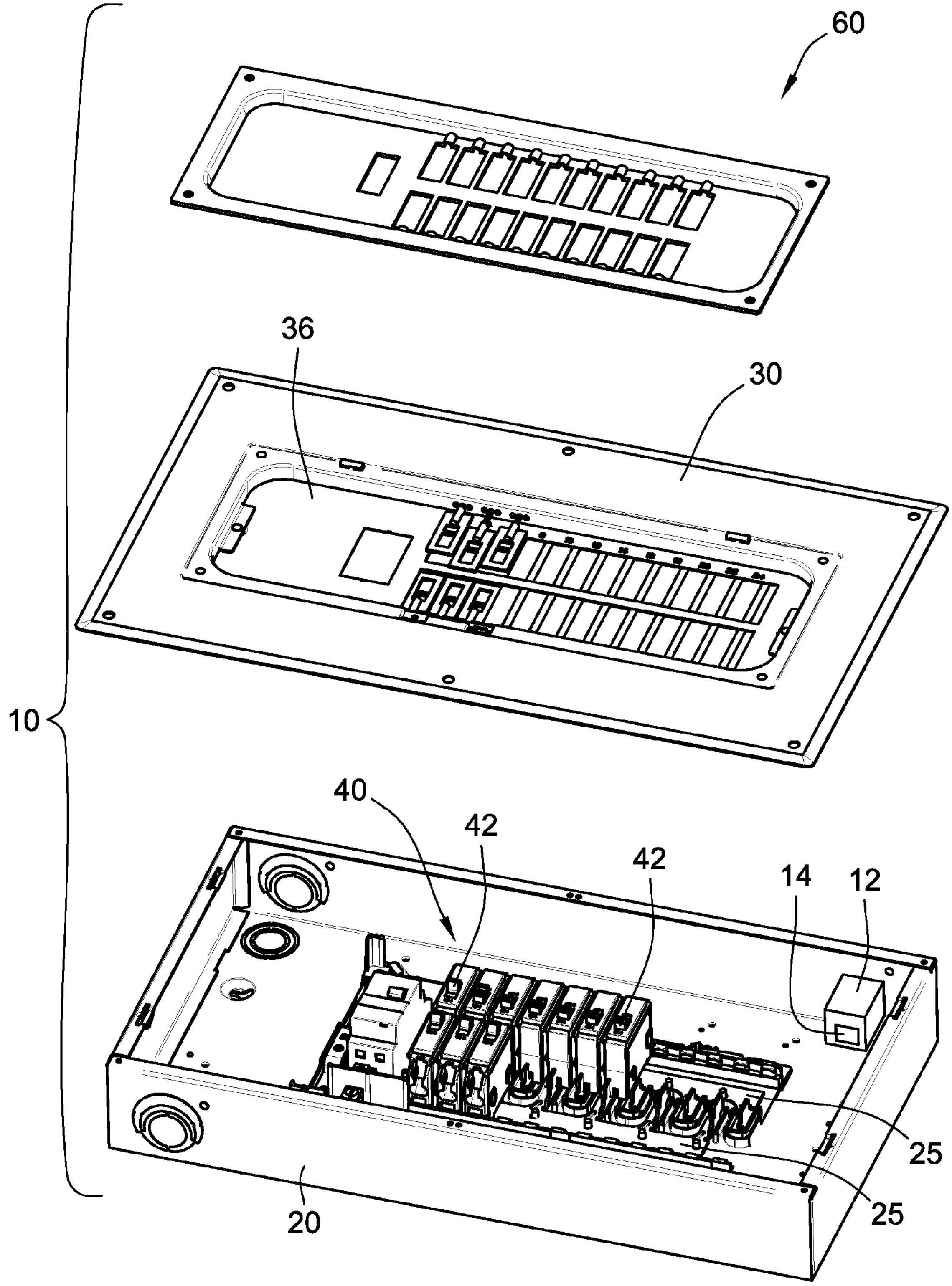
FIG. 2 is a partially exploded perspective view of the load center of FIG. 1.

Referring to FIG. 2, two busbars 25 are mounted to the housing 20 for distributing one or more phases of electricity. More or fewer busbars 25 can be mounted to the housing 20 for distributing the same or additional phases of electricity. The busbars 25 are formed from any electrically conducting material, as is known in the art, such as copper. The busbars 25 are positioned within the housing 20 such that each of the busbars 25 is electrically insulated from the housing 20.

Figure 4:
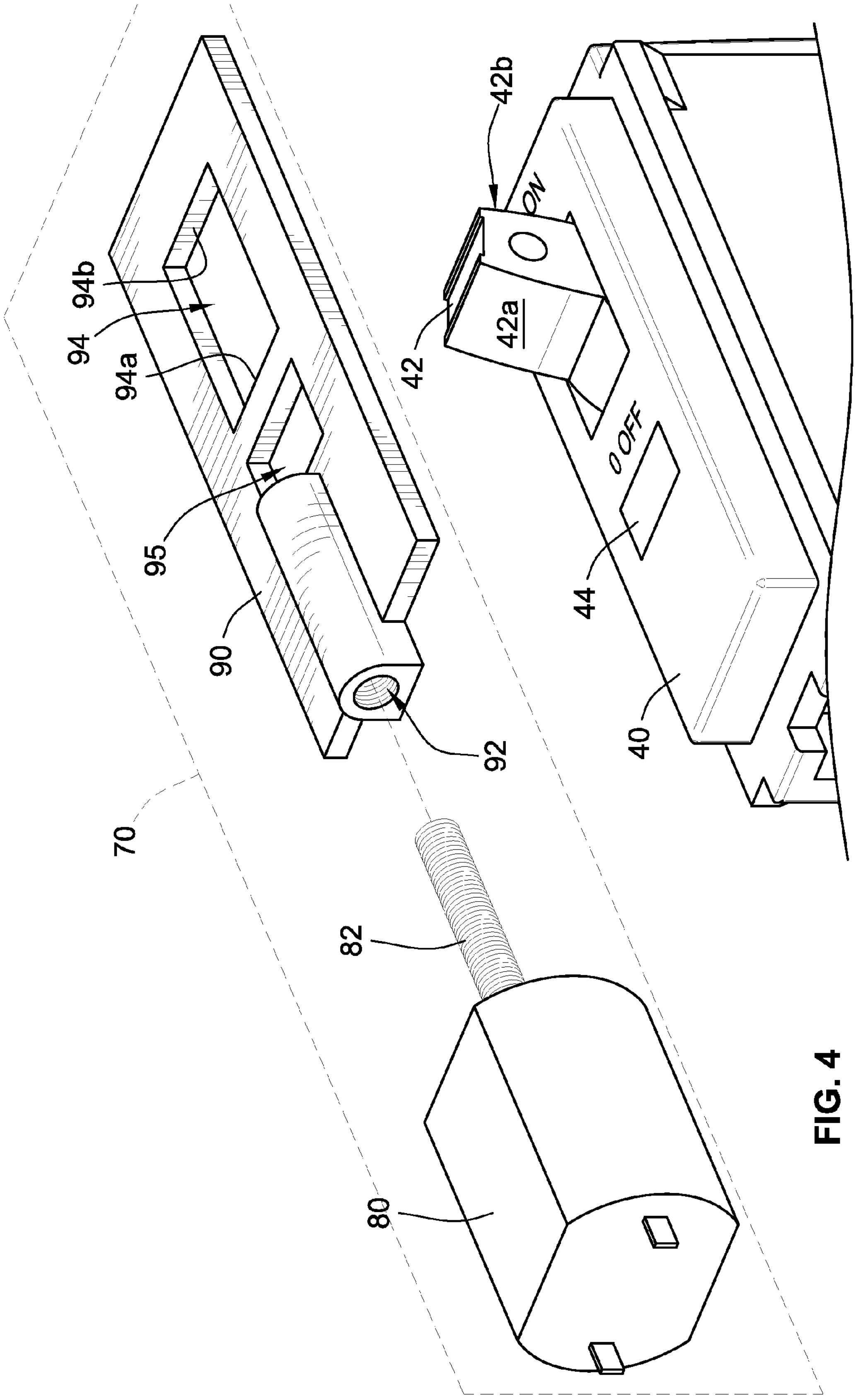
FIG. 4 is a perspective view of an actuator assembly and a partial perspective view of a circuit breaker of the load center of FIG. 1.

As shown, ten circuit breakers 40 are positioned in the housing 20 and electrically coupled to the busbars 25, although additional or fewer circuit breakers can be provided. As best shown in FIG. 4, each of the circuit breakers 40 includes a handle 42 for manually switching the circuit breaker 40 between an OFF position and an ON position. The handle 42 includes two opposing surfaces 42*a,b* that can be engaged manually, for example, by an operator (e.g., an operator's fingers) or automatically, for example, by an actuator assembly 70 (FIG. 4) of the present disclosure, to switch the circuit breaker 40 between its OFF and ON positions. The handle 42 can also be used to reset the circuit breaker 40 from a TRIPPED position (not shown) to the ON and/or OFF positions.

Each of the circuit breakers 40 can include a visual trip indictor 44 (FIG. 4) adjacent to the handle 42 for visually indicting if the circuit breaker 40 has tripped and is therefore in the TRIPPED position (not shown). The visual trip indicator 44 includes a window in a surface of the circuit breaker 40 that is populated with a flag (e.g., bright orange element) when the circuit breaker 40 is tripped (the circuit breaker 40 in FIG. 4 is shown as not being tripped as no flag is viewable through the window of the visual trip indicator 44). As shown in FIG. 2, the circuit breakers 40 are single-pole, standard, miniature circuit breakers such as, for example, the QO® or HOMELINE® circuit breakers provided by Schneider-Electric USA, Inc. However, the circuit breakers 40 can be any type, size, and/or make of circuit breaker, such as, for example, two-pole, three-pole, ¾ inch, inch, etc.

Figure 3:
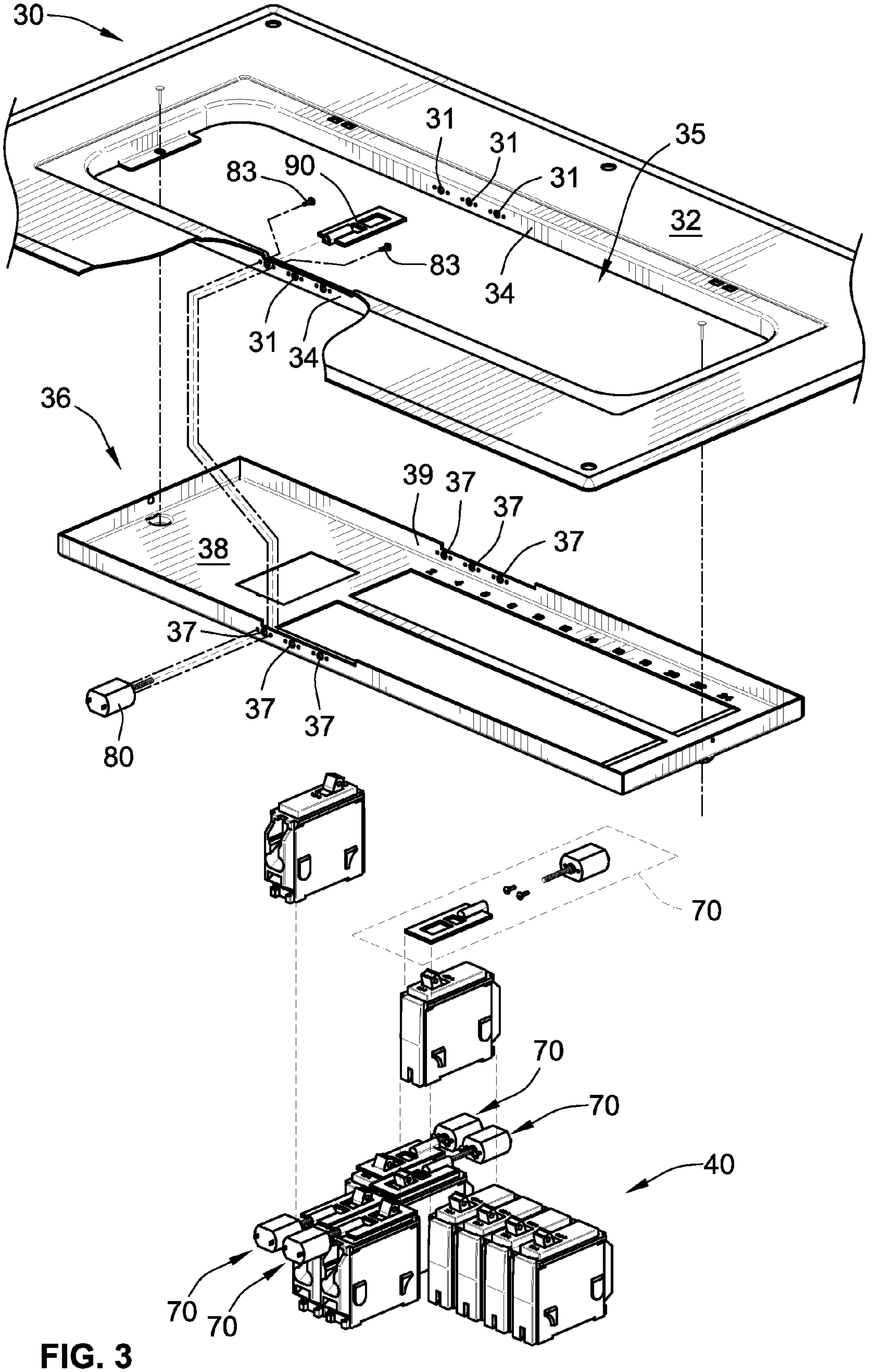
FIG. 3 is a further partially exploded, partial perspective view of the load center of FIG. 2.

As best seen in FIGS. 1 and 2, the cover 30 of the load center 10 is generally rectangular to match the face of the housing 20, although various alternative shapes and sizes of the cover 30 and the housing 20 are possible. As shown in FIG. 3, the cover 30 includes a generally flat sheet portion 32 that forms an opening 35 in the cover 30. The opening 35 is sized and positioned to provide access to internal components (e.g., the circuit breakers 40) of the load center 10. The opening 35 is generally rectangular, although various alternative shapes and sizes of the opening 35 are possible.

The cover 30 includes a flange 34 that circumscribes the opening 35 and extends generally perpendicular from the generally flat sheet portion 32 of the cover 30. The flange 34 aids in providing structural rigidity to the cover 30. The flange 34 can also provide a mounting location for an optional deadfront trim element 36 via, for example, one or more fastening elements (e.g., screws, nuts and bolts, welding, etc.) which are not shown.

Figure 7:
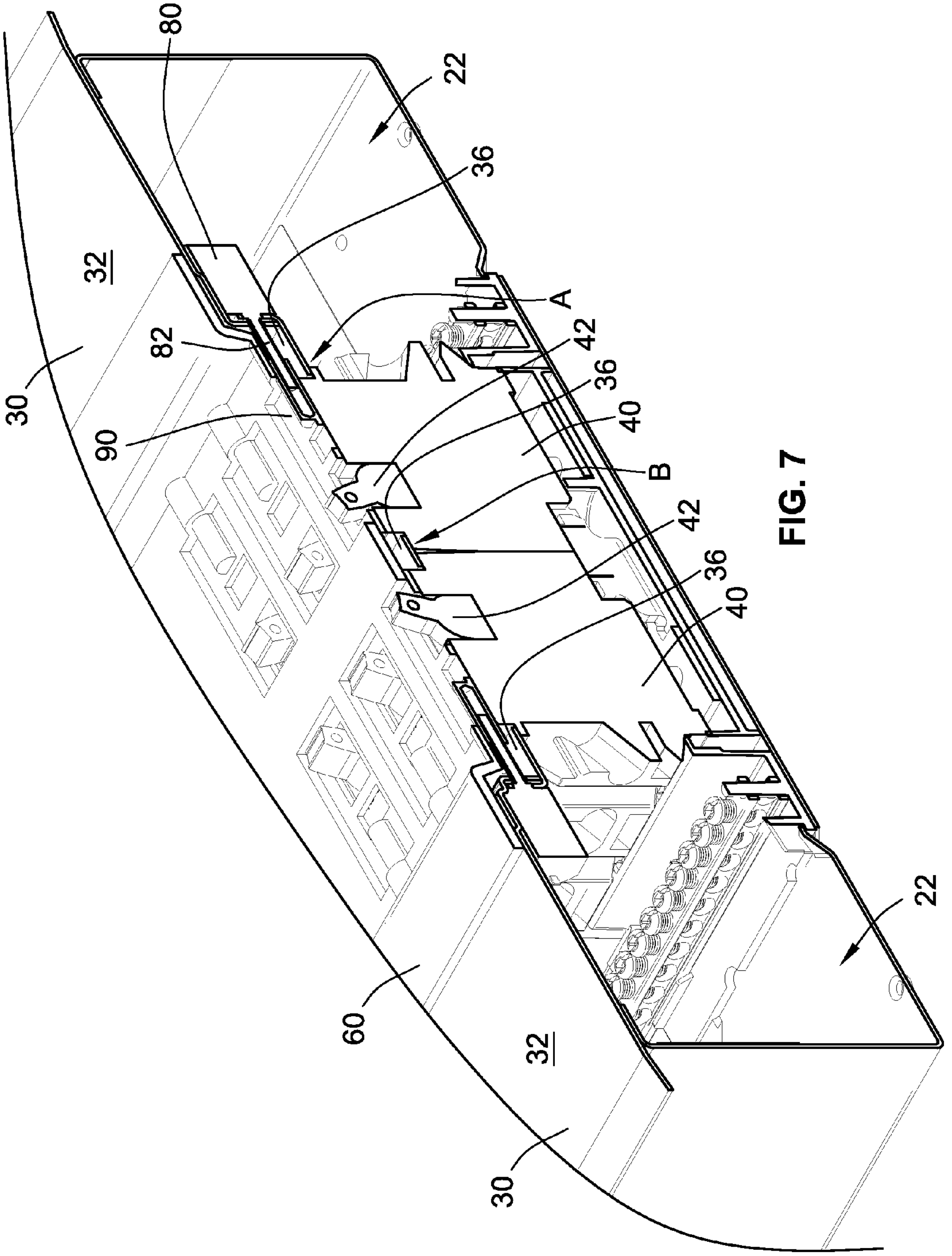
FIG. 7 is a cross-sectional perspective view of the load center of FIG. 1.

As shown in FIG. 3, the deadfront trim element 36 includes a generally flat sheet portion 38 and a flange 39. The generally flat sheet portion 38 of the deadfront trim element 36 forms one or more openings to provide access to internal components (e.g., circuit breakers 40) of the load center 10. When the cover 30, and the deadfront trim element 36 attached thereto, is attached to the housing 20 (shown in FIG. 1), a bottom surface of the generally flat sheet portion 38 of the deadfront trim element 36 abuts a portion of each circuit breaker 40 installed in the load center 10, which is best shown in FIG. 7 and indicated by arrows A and B. As such, the deadfront trim element 36 aids in maintaining each circuit breaker 40 in electrical connection with the busbars 25 when the cover 30 is attached to the housing 20. While the cover 30 and the deadfront trim element 36 are shown as described as being separate elements, the cover 30 and the deadfront trim element 36 can be an integral element (not shown).

Referring to FIG. 3, the flange 34 of the cover 30 and/or the flange 39 of the deadfront trim element can provide a mounting surface for one or more actuator assemblies 70. As shown in FIGS. 2 and 3, six actuator assemblies are provided (e.g., retrofitted into the load center 10) for remotely controlling and/or coupling to six of the circuit breakers 40 installed therein. Additional or fewer actuator assemblies 70 can be provided for remotely controlling some or all of the circuit breakers 40 installed in the load center 10.

As best shown in FIG. 4, each actuator assembly 70 includes a motor 80 and an actuator member 90. The motor 80 is a rotational motor that rotates a threaded drive shaft 82 in response to electricity being supplied to the motor 80, by, for example, a controller 12 (FIG. 2) positioned in the housing 20, or external to the housing 20 (not shown). The controller 12 is electrically coupled to each of the motors 80, in any desired manner, (wires not shown) and is configured to selectively supply electricity to the motors 80 to cause the threaded drive shafts 82 of the motors 80 to rotate clockwise and/or counterclockwise. The controller 12 includes a communications interface 14 (FIG. 2) for electronically coupling the controller 12 to one or more devices (e.g., router, computer, processor, smart phone, etc., or any combination thereof)

configured to remotely control the controller 12 and/or the motors 80, and hence, the circuit breakers 40 via the actuator assemblies 70.

The actuator member 90 includes a threaded bore 92 that is configured to threadingly couple with the threaded drive shaft 82 of the motor 80 (e.g., the threaded bore 92 can be screwed onto the threaded drive shaft 82). The actuator member 90 further includes a first aperture 94 and a second aperture 95. The first aperture 94 of the actuator member 90 is also referred to as a handle aperture. The second aperture 95 of the actuator member 90 is also referred to as the trip-indicating aperture. The first aperture 94 of the actuator member 90 forms a first actuating surface 94*a* and a second actuating surface 94*b*. The actuating surfaces 94*a,b* are for engaging a respective one of the two opposing surfaces 42*a* and 42*b* of the handle 42 of the circuit breaker 40. Specifically, when the circuit breaker 40 is installed in the housing 20 and the actuator assembly 70 is attached to the cover 30, the handle 42 of the circuit breaker 40 protrudes through the first aperture 94 of the actuator member 90 such that the first and second actuating surfaces 94*a,b* are configured to engage and push and/or pull (e.g., in response to the motor 80 rotating the threaded drive shaft 82) respective ones of the two opposing surfaces 42*a,b* of the handle 42, thereby switching the circuit breaker 40 between its ON and OFF positions.

Figure 8A:
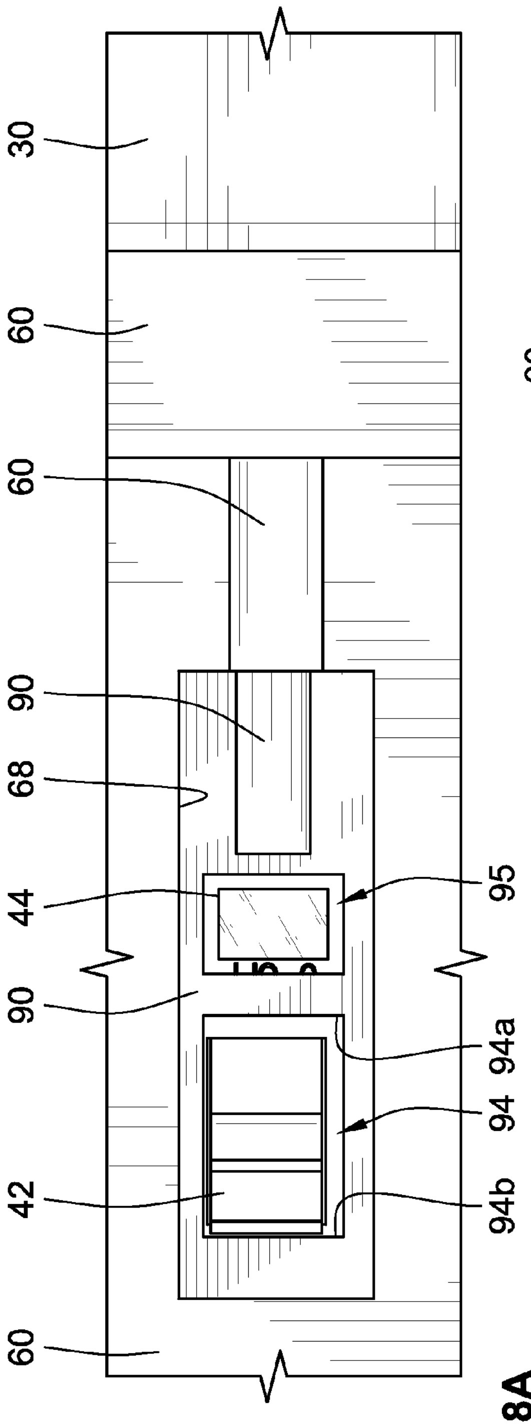
FIG. 8A is a partial top view of the load center of FIG. 1 with a circuit breaker in an ON position and an actuator member in a neutral position.
Figure 8B:
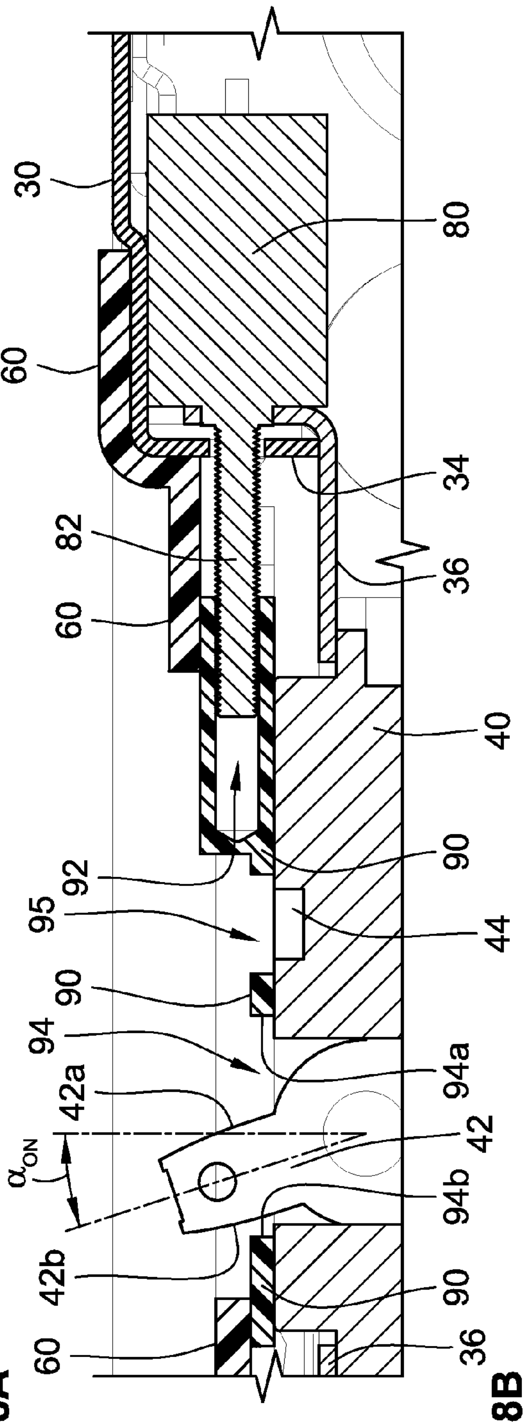
FIG. 8B is a partial cross-sectional view of FIG. 8A.
Figures 9A, 9B:
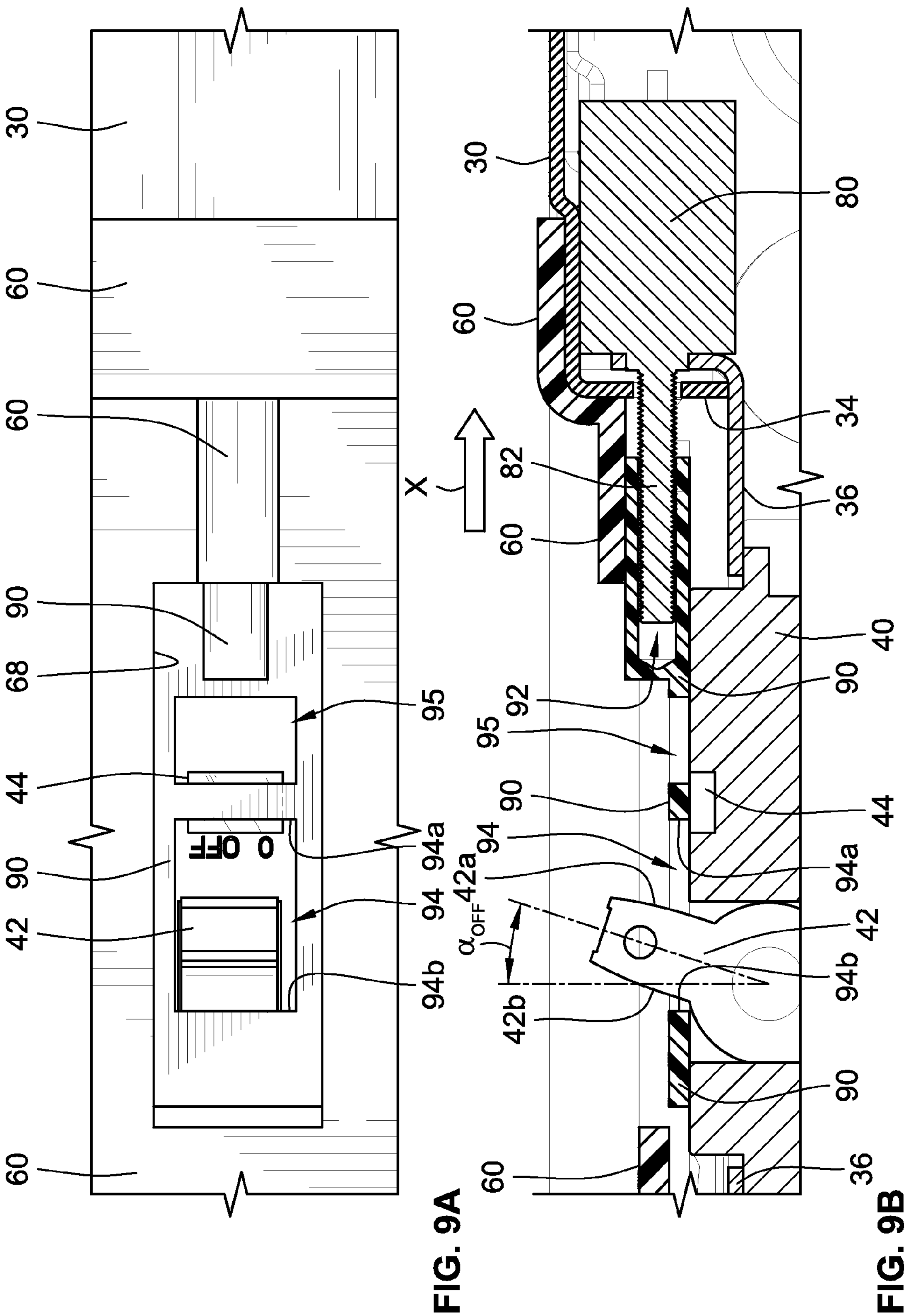
FIG. 9A is a partial top view of the load center of FIG. 1 with a circuit breaker in an OFF position and an actuator member in a first position.
FIG. 9B is a partial cross-sectional view of FIG. 9A.
Figure 10A:
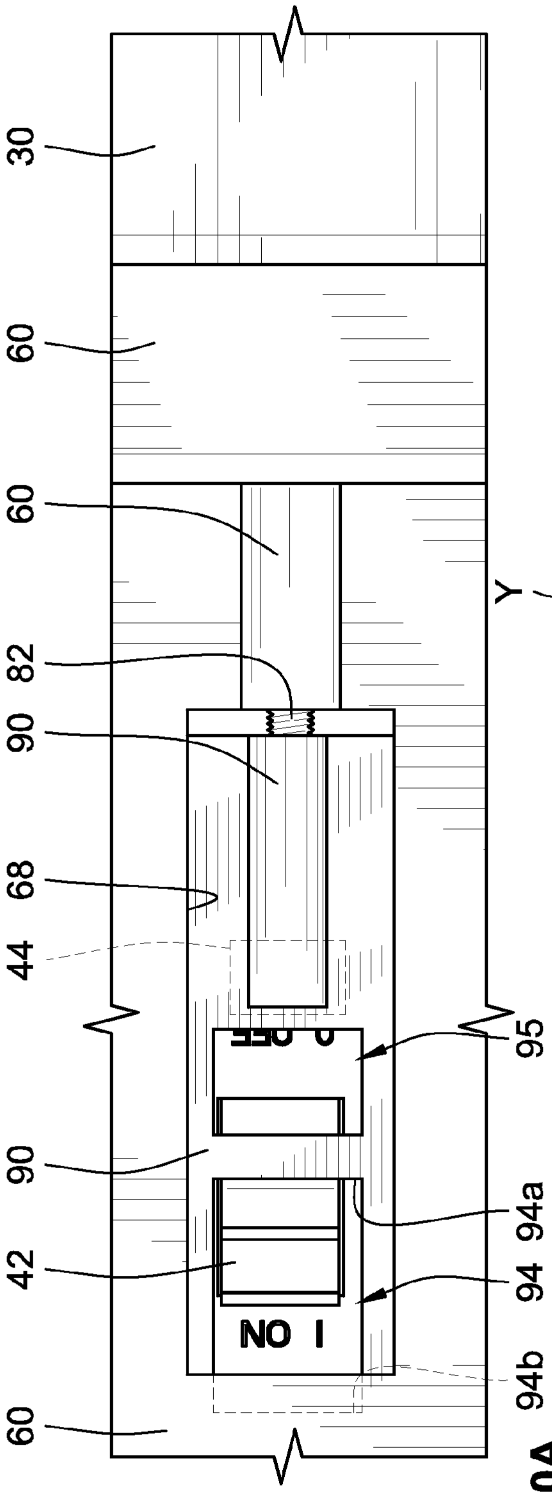
FIG. 10A is a partial top view of the load center of FIG. 1 with a circuit breaker in an ON position and an actuator member in a second position.
Figure 10B:
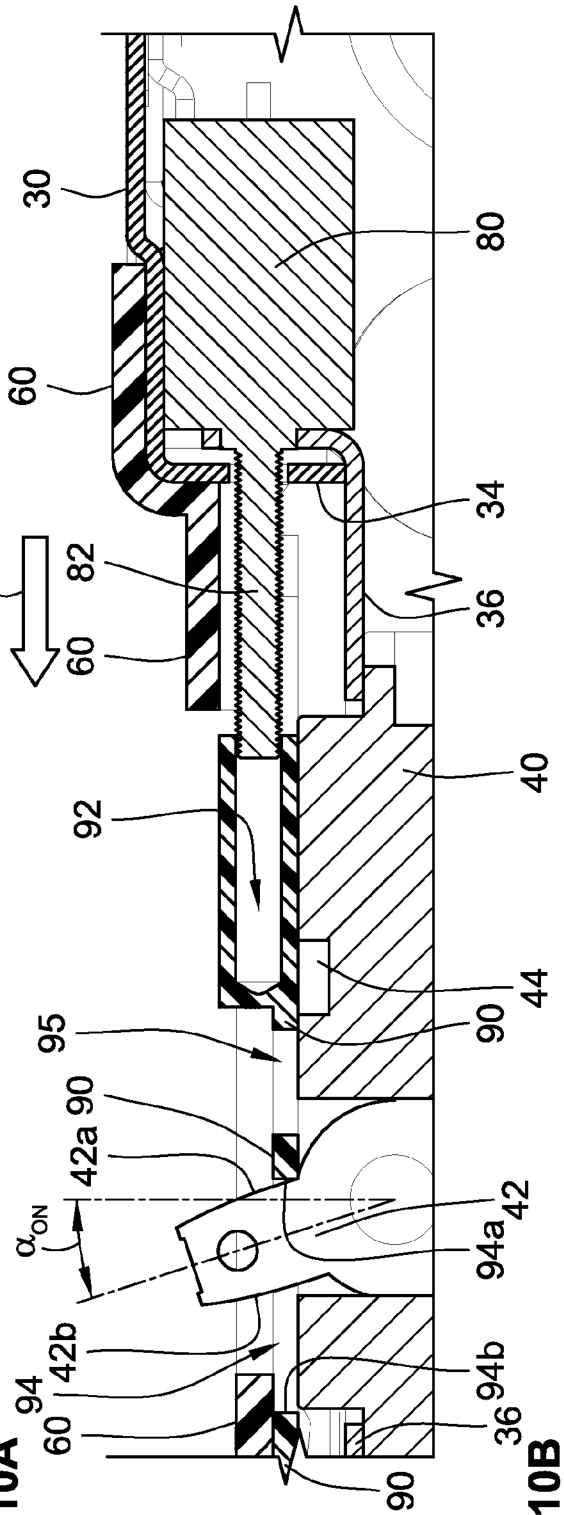
FIG. 10B is a partial cross-sectional view of FIG. 10A.

As best shown in partial cross-sectional FIGS. 8B, 9B, and 10B, the handle 42 is positioned at an angle relative to vertical when it is the ON and OFF positions. Specifically, when the handle 42 is in its OFF position (FIG. 9B), the handle 42 is at an angle of $\alpha_{OFF}$ with respect to vertical. Similarly, when the handle 42 is in its ON position (FIGS. 8B and 10B), the handle 42 is at an angle of $\alpha_{ON}$ with respect to vertical. Thus, the opposing surfaces 42*a,b* of the handle 42 are also positioned at angles relative to vertical when the handle is in the ON or OFF position. The angle of the opposing surfaces 42*a,b* of the handle 42 relative to vertical can be the same as, or different from, the angle of the handle 42 with respect to vertical depending on the design of the handle 42 and of its opposing surfaces 42*a,b*.

To aid in the engagement between the actuating surfaces 94*a,b* and the opposing surfaces 42*a,b* when remotely operating the handle 42 via the actuator assembly 70, the actuating surfaces 94*a,b* can be provided at an angle relative to vertical (not shown). While the angle of the actuating surfaces 94*a,b* relative to vertical is shown in FIGS. 8A to 10B as being zero, the angle of one or both of the actuating surfaces 94*a,b* can be the same as, or similar to, the angles $\alpha_{ON}$ or $\alpha_{OFF}$. Alternatively, the angle of the actuating surfaces 94*a,b* can be a percentage of the angles $\alpha_{ON}$ or $\alpha_{OFF}$ and/or a percentage of the angles of the opposing surfaces 42*a,b* (e.g., 95%, 75%, 50%, 25%, etc.). For example, if the angle $\alpha_{OFF}$ is positive twenty degrees with respect to vertical, the angle of the first actuating surface 94*a* can be positive or negative twenty degrees, positive or negative ten degrees, positive or negative five degrees, etc. Similarly, if the angle of the first surface 42*a* of the handle 42 is positive twenty degrees with respect to vertical, the angle of the first actuating surface 94*a* can be positive or negative 20 degrees, positive or negative ten degrees, positive or negative five degrees, etc. Various other angles and combinations of angles of the opposing surfaces 42*a,b* and of the actuating surfaces 94*a,b* are contemplated for aiding in the engagement therebetween. For example, if $\alpha_{ON}$ is negative twenty degrees with respect to vertical and $\alpha_{OFF}$ is positive twenty degrees with respect to vertical, the angle of the first actuating surface 94*a* can be positive twenty degrees with respect to vertical and the angle of the second actuating surface 94*b* can be negative twenty degrees with respect to vertical. By aiding in the engagement between the actuating surfaces 94*a,b* and the opposing surfaces 42*a,b* of the handle 42, it is generally meant that the actuating surfaces 94*a,b* are angled to provide relatively more contact surface area during the initial contact of the actuating surfaces 94*a,b* and the opposing surfaces 42*a,b* of the handle 42.

Alternatively, the actuating surfaces 94*a,b* of the actuating member 90 can be curved and/or rounded surfaces (not shown) (e.g., convex surfaces). Such rounded and/or curved actuating surfaces (not shown) of the actuating member provide for a perpendicular engagement force of the actuator member acting on the opposing surfaces 42*a,b* of the handle 42 regardless of the angle of the handle 42 and/or the angle of the opposing surfaces 42*a,b*, which can reduce friction therebetween leading to a relatively smoother operation.

The second aperture 95 (FIG. 4) can optionally be provided in the actuator member 90 such that when the circuit breaker 40 is installed in the housing 20 and the actuator assembly 70 is attached to the cover 30, the visual trip indictor 44 (FIG. 4) of the circuit breaker 40 is viewable therethrough. That is, the actuator member 90 is designed such that it does not obstruct the visual trip indictor 44. Additionally or alternatively, the visual trip indictor 44 is only viewable (e.g., not obstructed by the actuator member 90) in response to the actuator member 90 being in a predetermined position (e.g., a neutral position as best shown in FIGS. 8A and 8B).

Figure 5:
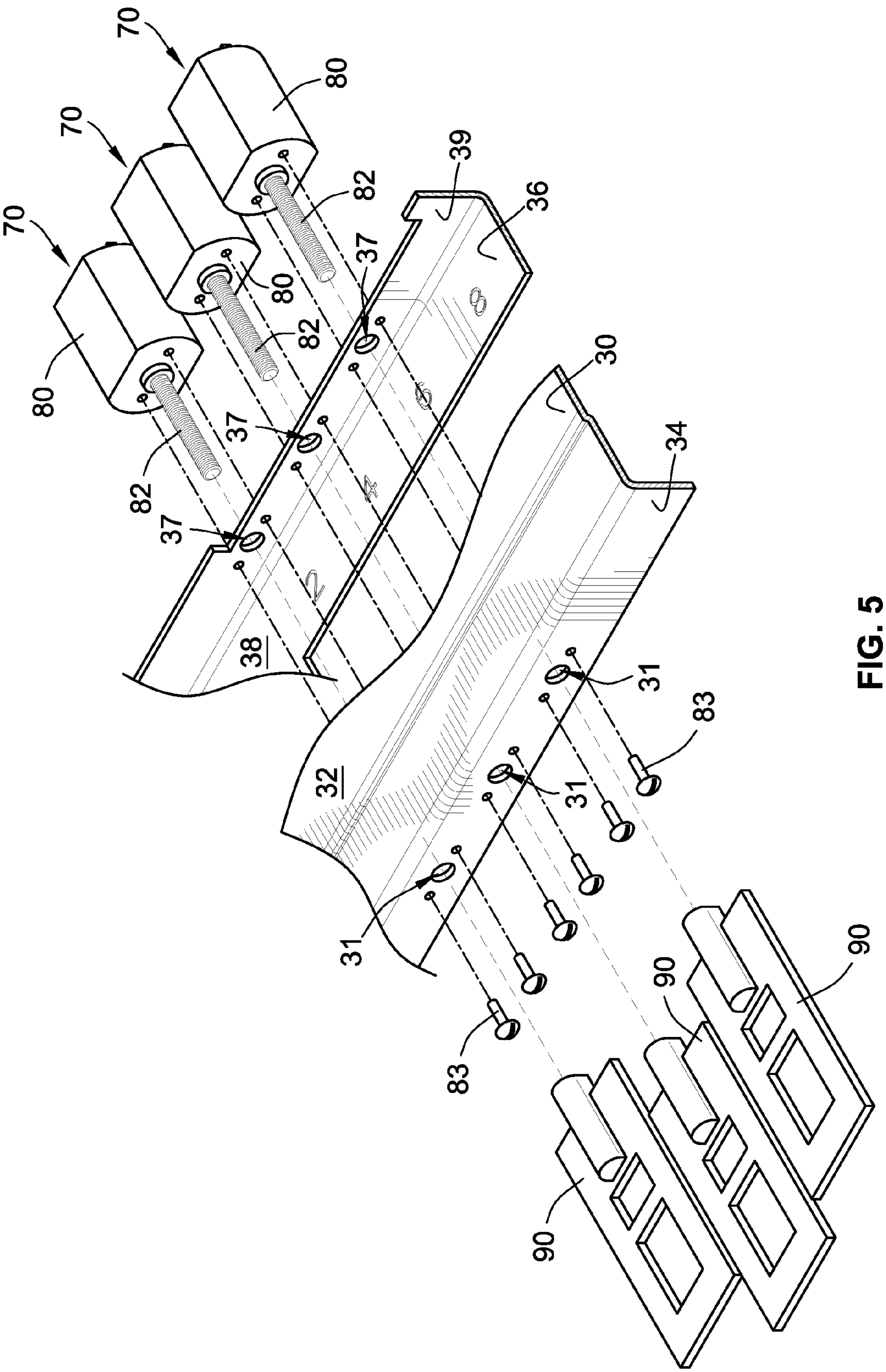
FIG. 5 is an exploded, partial perspective view of three actuator assemblies relative to portions of a cover and a deadfront trim element of the load center of FIG. 1.

Referring to FIG. 5, three of the actuator assemblies 70 of the present disclosure are shown in an exploded manner to illustrate how the actuator assemblies 70 attach to the load center 10. In the illustrated example, where the cover 30 and the deadfront trim element 36 are separate elements, apertures 31 (e.g., drive-shaft apertures) are provided in and/or formed in the flange 34 of the cover 30 and corresponding apertures 37 (e.g., drive-shaft apertures) are provided in and/or formed in the flange 39 of the deadfront trim element 36. The threaded drive shafts 82 of the motors 80 are positioned through corresponding ones of the apertures 31, 37 and the motors 80 are attached to the flanges 34, 39 via, for example, one or more fastening devices 83 (e.g., screws, nuts and bolts, welding, etc.) that are positioned through corresponding apertures in the cover 30 and/or the deadfront trim element 36.

The motors 80 are fixed relative to the cover 30 (e.g., move with the cover 30) by the fastening devices 83 such that the motors 80 are positioned under the generally flat sheet portion 32 of the cover 30 (e.g., positioned between the cover 30 and the housing 20). Additionally, the motors 80 are attached to the cover 30 such that the axis of rotation of the threaded drive shafts 82 are each generally perpendicular to the flange 34 of the cover. As best shown in FIG. 7, the motors 80 are positioned in the wire gutters 22 (e.g., in the upper portion of the wire gutters 22) of the housing 20 where incoming and outgoing electrical wires (not shown) are typically positioned for attachment to the circuit breakers 40.

Figure 6A:
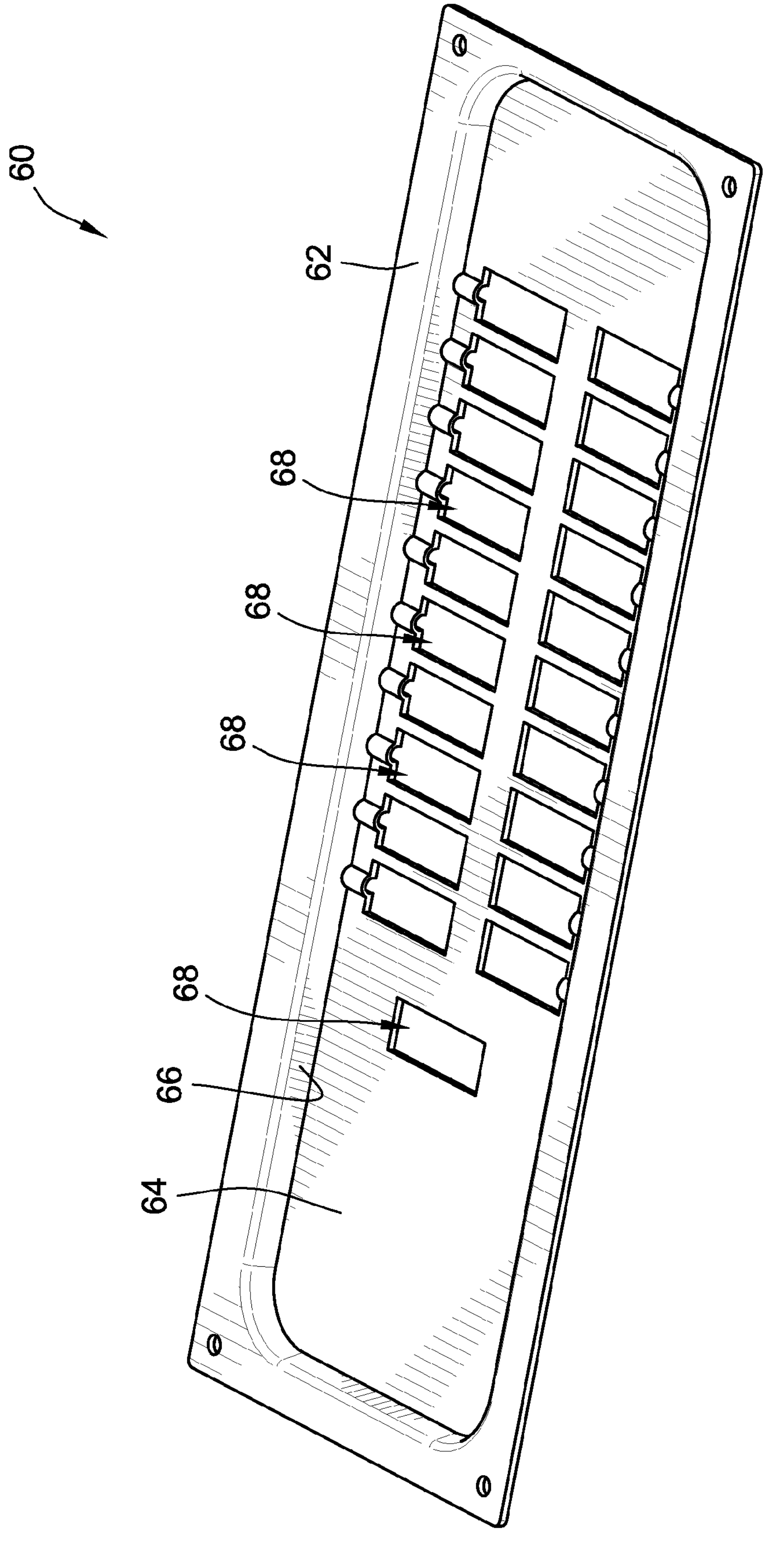
FIGS. 6A and 6B are perspective views of a guide insert of the load center of FIG. 1.
Figure 6B:
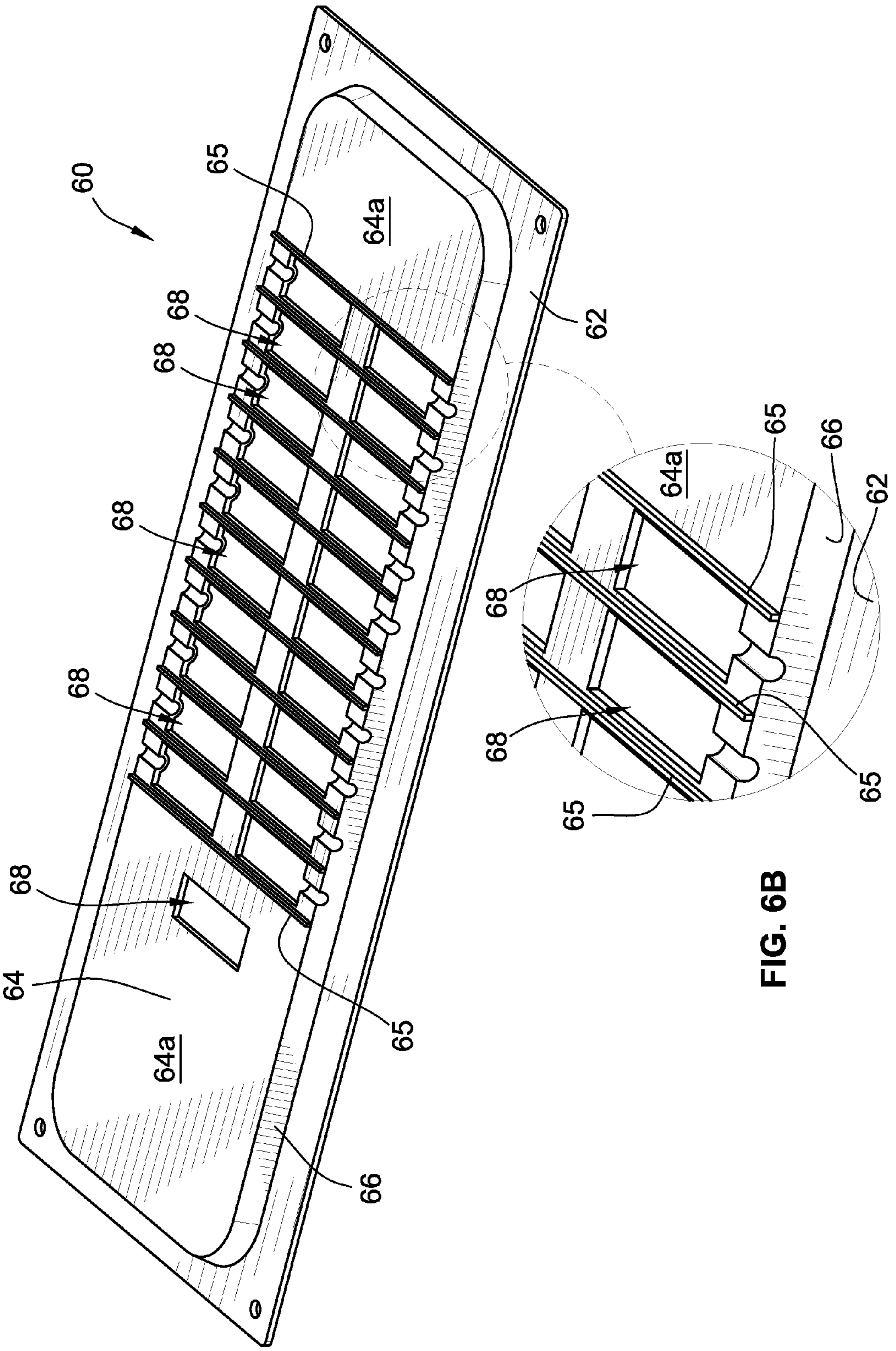

Referring to FIGS. 6A and 6B, the guide insert 60 is generally rectangular and sized and shaped to be at least partially inserted into the opening 35 (FIG. 3) of the cover 30. The guide insert 60 is a unitary element that includes a trim portion 62, a generally flat sheet portion 64, and a flange 66, although the guide insert 60 can be made of more than one element (e.g., the flange 66 can be separate and distinct from the trim portion 62 but attached via a fastener, which is not shown). The flange 66 extends perpendicular to, and unifies, the trim portion 62 with the generally flat sheet portion 64. The sheet portion 64 includes a plurality of apertures 68 (e.g., face apertures) to provide access to the internal components (e.g., handles 42 of the circuit breakers 40) of the load center 10. The trim portion 62 of the guide insert 60 can be attached to the cover 30 via, for example, one or more fasteners (e.g., screws, nuts and bolts, welds, etc.) such that a bottom surface 64*a* of the sheet portion 64 (FIG. 6B) is adjacent to and/or abuts portions of one or more of the actuator members 90, which is best shown in FIG. 7.

The optional guide insert 60 can be attached to the cover 30 to (1) protect the actuator assemblies 70 from external conditions and/or forces, (2) substantially prevent rotation of the actuator members 90 when the threaded drive shafts 82 of the motors 80 rotate, (3) aid in linearly guiding the actuator members 90 when translating between a first position (FIGS. 9A and 9B) and a second position (FIGS. 10A and 10B) of the actuator member (described below), or any combination thereof.

As best shown in FIG. 7, in addition to portions of respective bottom surfaces of the actuator members 90 abutting portions of upper surfaces of the circuit breakers 40, the bottom surface 64*a* (FIG. 6B) of the guide insert 60 abuts portions of the actuator members 90 such that rotation of the actuator members 90 is substantially prevented when the threaded drive shafts 82 rotate within the threaded bores 92 of the actuator members 90, thereby causing the actuator members 90 to translate. That is, the positioning of the actuator members 90 between the circuit breakers 40 and the guide insert 60 substantially prevents rotation of the actuator members 90. As such, rotation of the threaded drive shafts 82 causes translation of the actuator members 90 relative to the motors 80, the circuit breakers 40, and the guide insert 60.

As shown in FIG. 6B, the bottom surface 64*a* of the sheet portion 64 of the guide insert 60 includes a plurality of spaced apart ribs 65. The ribs 65 are positioned adjacent to the apertures 68 of the guide insert 60 such that when the guide insert 60 is attached to the cover 30, the ribs 65 flank corresponding ones of the actuator members 90. The ribs 65, thus, aid in guiding the actuator members 90 in a linear path when translating between the first position (FIGS. 9A and 9B) and the second position (FIGS. 10A and 10B) of the actuator members 90.

Method of Remotely Controlling Circuit Breakers Using an Actuator Assembly

Generally referring to FIGS. 8A to 10B, the handle 42 of the circuit breaker 40 is shown in its ON and OFF positions and the actuator member 90 is shown in the first position, the second position, and the neutral position between the first and the second positions. Specifically, as shown in FIGS. 8A and 8B, the handle 42 of the circuit breaker 40 is in its ON position and the actuator member 90 is in the neutral position, which is the normal operating position for the circuit breaker 40 and for the actuator member 90. As described herein and as shown best in FIG. 8B, when the actuator member 90 is in its neutral position, the handle 42 of the circuit breaker 40 enjoys a full range of travel without motor control. That is, the handle 42 can be moved and/or switched from the ON position (shown in FIGS. 8A and 8B) to its OFF position (shown in FIGS. 9A and 9B) without use of the motor 80 and without moving the actuator member 90 as the actuator member 90 does not touch or impede movement of, and/or access to, the handle 42 when the actuator member 90 is in its neutral position (FIGS. 8A and 8B).

Starting with the handle 42 in the ON position and the actuator member 90 in its neutral position (as shown in FIGS. 8A and 8B), in response to the controller 12 (FIG. 2) receiving an instruction and/or a command, via, for example, the communications interface, to remotely switch the circuit breaker 40 from its ON position (FIGS. 8A and 8B) to its OFF position (FIGS. 9A and 9B), the controller 12 causes the motor 80 to rotate the threaded drive shaft 82 in a first direction (e.g., clockwise). As the threaded drive shaft 82 is threadingly coupled with the internal bore 92 of the actuator member 90, and as the actuator member 90 is prevented from substantially rotating (e.g., by its position relative to the circuit breaker 40 and/or the guide insert 60), clockwise rotation of the threaded drive shaft 82 causes the actuator member 90 to translate in the direction of arrow X (FIG. 9B) from its neutral position (FIGS. 8A and 8B) to its first position (FIGS. 9A and 9B). During the translation of the actuator member 90 from its neutral position to its first position, the second actuating surface 94*b* (FIGS. 9A and 9B) engages the second surface 42*b* of the handle 42 and pulls the handle 42 from its ON position to its OFF position. If the circuit breaker 40 is to remain in the OFF position, the actuator member 90 is moved back into its neutral position by rotating the threaded drive shaft 82 in a second direction (e.g., counterclockwise) until the actuator member 90 is in the neutral position such that the handle 42 has a full range of travel without motor control.

Similarly, starting with the handle 42 in the OFF position and the actuator member 90 in its first position (as shown in FIGS. 9A and 9B), in response to the controller 12 (FIG. 2) receiving an instruction and/or a command, via the communications interface, to remotely switch the circuit breaker 40 from its OFF position (FIGS. 9A and 9B) to its ON position (FIGS. 10A and 10B), the controller 12 causes the motor 80 to rotate the threaded drive shaft 82 in the second direction (e.g., counterclockwise). As the threaded drive shaft 82 is threadingly coupled with the internal bore 92 of the actuator member 90, and as the actuator member 90 is prevented from substantially rotating (e.g., by its position relative to the circuit breaker 40 and/or the guide insert 60), counterclockwise rotation of the threaded drive shaft 82 causes the actuator member 90 to translate in the direction of arrow Y (FIG. 10B) from its first position (FIGS. 9A and 9B), to is neutral position (FIGS. 8A and 8B), and then to its second position (FIGS. 10A and 10B). During the translation of the actuator member 90 from its first position to its second position, the first actuating surface 94*a* (FIGS. 10A and 10B) engages the first surface 42*a* of the handle 42 and pushes the handle 42 from its OFF position to its ON position. If the circuit breaker 40 is to remain in the ON position, the actuator member 90 is moved back into its neutral position by rotating the threaded drive shaft 82 in the first direction (e.g., clockwise) until the actuator member 90 is in the neutral position such that the handle 42 has a full range of travel without motor control.

Method of Retrofitting a Load Center to Remotely Control a Circuit Breaker

The actuator assemblies 70 of the present disclosure can be installed into a load center (e.g., the load center 10) in a factory and/or assembly plant prior to the load center being installed in a permanent-final-operation location (e.g., wall of a house, building, factory, etc.). Alternatively, the actuator assemblies 70 of the present disclosure can be retrofitted into a load center that is already installed in its permanent-final-operation location. In such situations, the following method can be performed to retrofit such a load center for remote operation via one or more of the actuator assemblies 70.

Initially, a cover of the load center is removed from a housing of the load center revealing a multitude of previously installed circuit breakers therein. Each of the circuit breakers is already electrically coupled to one or more busbars positioned within the housing of the load center for distributing one or more phases of electricity to one or more loads. If a door is attached to the cover, the door can be removed from the cover for ease of modification of the cover.

A replacement cover is provided as an element of a retrofitting kit. The replacement cover includes a plurality of preformed drive-shaft apertures (e.g., apertures 31, 37) formed therein. In some instances, each of the preformed drive-shaft apertures can be partially obstructed with a knock-out element that is removable to provide access for each actuator assembly to be retrofitted into the load center.

Alternatively to providing a replacement cover, the original cover can be modified. Specifically, a retrofitter (e.g., an electrician) can create an aperture (e.g., apertures 31, 37) in the original cover and/or the deadfront trim element for each actuator assembly to be retrofitted into the load center. In some instances, the aperture is created in a flange of the cover and/or a flange of the deadfront trim element. A template for modifying the original cover can be provided to aid the retrofitter in creating the aperture(s) in the appropriate position(s) of the original cover.

A rotational motor is mounted to the replacement or original cover for each of the actuator assemblies such that a threaded drive shaft of the motor protrudes through the created aperture(s) of the cover and/or deadfront trim element. The motor can be attached via one or more fastening devices such as, for example, screws, nuts and bolts, glue, welding, etc. Additionally, the motor is attached such that the axis of rotation of the threaded drive shaft is generally perpendicular to the flange of the cover. An actuator member is threadingly coupled to the threaded drive shaft by, for example, screwing a threaded bore of the actuator member onto the threaded drive shaft of the motor.

One or more controllers, communications interfaces, processors, computers, or any combination thereof, is installed into the housing and/or outside of the housing. At least a controller is electrically coupled each of the motors for selectively controlling operation of the motors. Alternatively, each of the motors includes a built-in communication interface configured to wirelessly couple with an external controller.

The original cover is reattached—or the replacement cover is attached—to the housing of the load center with the retrofitted actuator assemblies installed thereon such that each of the actuator members at least partially abuts a respective circuit breaker and such that a respective handle of the circuit breakers protrudes through a respective aperture of the actuator member. The door, if provided, can then be reattached to the original cover or attached to the replacement cover. Alternatively, prior to reattaching the cover (original or replacement), the door can be reattached to the cover (original or replacement).

In some implementations, the method of retrofitting can further include a guide insert that is attached to the cover (original or replacement) of the load center such that the guide insert at least partially abuts the actuator members. The guide insert is attached such that the handles of the circuit breakers protrude through respective apertures in the guide insert, thereby providing access to the handles through the guide insert.

The load center of the above method of retrofitting can be the same as, or similar to the load center 10 described herein and shown in the figures. Similarly, the housing, the cover, the deadfront trim element, the circuit breakers, the busbars, the motors, the actuator members, and the guide insert of the above method of retrofitting can be the same as, or similar to, the housing 20, the cover 30, the deadfront trim element 36, the circuit breakers 40, the busbars 25, the motors 80, the actuator members 90, and the guide insert 60 described herein and shown in the figures.

Kit for Retrofitting a Load Center to Remotely Control Circuit Breaker(s)

A kit for retrofitting a load center to remotely control one or more circuit breakers previously installed in the load center includes a replacement cover, a plurality of rotational motors 80, a plurality of actuator members 90, and optionally a guide insert 60. The replacement cover includes a plurality of preformed drive-shaft apertures that are the same as, or similar to the apertures 31, 37 described above. The replacement cover can be the same as the original cover 30 except for the preformed drive-shaft apertures being formed therein. Providing a replacement cover with the preformed drive-shaft apertures makes retrofitting a load center on site (e.g., in a building or home) more convenient and easy for an installer (e.g., an electrician) as the installer does not need to create holes in the original cover.

While particular aspects, implementations, embodiments, and applications of the present disclosure have been illustrated and described herein, it is to be understood that the present disclosure is not limited to the precise construction and compositions disclosed herein and that various modifications, changes, and variations may be apparent from the foregoing descriptions without departing from the spirit and scope of the present disclosure as defined in the appended claims.

What is claimed is:

1. A load center, comprising:

a housing having a busbar positioned therein, the busbar being configured to distribute a phase of electricity entering the load center;

a cover removably attached to the housing;

a circuit breaker coupled to the busbar, the circuit breaker including a handle having an ON position and an OFF position;

a rotational motor attached to the cover and positioned between the housing and the cover, the rotational motor including a threaded drive shaft positioned through a drive-shaft aperture in the cover; and an actuator member threadingly engaged with the threaded drive shaft of the rotational motor, the actuator member having a handle aperture forming a first actuating surface and a second actuating surface in the actuating member, the actuator member being oriented relative to the cover such that the handle of the circuit breaker is positioned through the handle aperture of the actuating member, wherein the rotational motor is configured to rotate the threaded drive shaft in a first direction to cause the actuator member to translate from a first position to a neutral position and then to a second position such that the first actuating surface is caused to engage the handle and switch the handle from the OFF position to the ON position, the handle of the circuit breaker having full range of travel between the ON and OFF positions when the actuator member is placed in the neutral position by the rotational motor.

2. The load center of claim 1, further comprising a guide insert attached to the cover, the guide insert being positioned adjacent to the actuator member to substantially prevent rotation of the actuator member in response to the rotational motor rotating the threaded drive shaft.

3. The load center of claim 2, wherein the guide insert includes a plurality of face apertures, the handle of the circuit breaker being positioned through one of the plurality of face apertures of the guide insert.

4. The load center of claim 3, wherein a bottom surface of the guide insert includes a plurality of spaced apart ribs, two of the ribs flanking the actuator member such that the two ribs aid in linearly guiding the actuator member in response to the actuator member being moved from the first position to the second position.

5. The load center of claim 3, further comprising a plurality of circuit breakers coupled to the busbar, each of the plurality of circuit breakers including a handle, each of the handles of the plurality of circuit breakers being positioned through a respective one of the plurality of face apertures in the guide insert.

6. The load center of claim 1, wherein the actuator member includes a trip-indicating aperture and wherein the actuator member is oriented relative to the cover such that a visual trip indicator of the circuit breaker is unobstructed by the actuator member and viewable through the trip-indicating aperture of the actuating member in response to the actuator member being at least in the neutral position.

7. The load center of claim 1, wherein the rotational motor is further configured to rotate the threaded drive shaft in a second direction opposite the first direction to cause the actuator member to translate from the second position to the neutral position and then to the first position such that the second actuating surface is caused to engage the handle and switch the handle from the ON position to the OFF position.

8. The load center of claim 1, wherein the rotational motor is electrically coupled to a controller configured to control rotation of the threaded drive shaft by the rotational motor.

9. The load center of claim 8, wherein the controller includes a communication interface.

10. The load center of claim 1, wherein the cover includes a flange and a generally flat sheet portion forming an opening in the cover, the flange at least partially circumscribing the opening and extending generally perpendicular from the generally flat sheet portion of the cover.

11. The load center of claim 10, wherein the rotational motor is attached to the flange of the cover and the drive-shaft aperture in the cover is in the flange such that an axis of rotation of the threaded drive shaft is generally perpendicular to the flange.

12. The load center of claim 1, wherein in response to the actuator member being in the neutral position, the handle of the circuit breaker has full range of travel between the ON and OFF positions without use of the rotational motor.

13. A method of retrofitting a load center to remotely control one or more circuit breakers installed therein, the method comprising:

removing a first cover from a housing of the load center revealing a plurality of circuit breakers therein, each of the circuit breakers being electrically coupled to one or more busbars positioned within the housing of the load center;

mounting a rotational motor to a second cover such that a threaded drive shaft of the motor protrudes through a drive-shaft aperture in the second cover;

threadingly coupling an actuator member to the threaded drive shaft, the actuator member including a handle aperture forming a first actuating surface and a second actuating surface in the actuating member; and attaching the second cover to the housing such that the actuator member at least partially abuts a first one of the circuit breakers and such that a handle of the first circuit breaker protrudes through the handle aperture of the actuator member.

14. The method of claim 13, further comprising attaching a guide insert to the second cover such that the guide insert at least partially abuts the actuator member.

15. The method of claim 14, wherein the guide insert includes a plurality of face apertures and the attaching the guide insert includes attaching the guide insert such that the handle of the first circuit breaker protrudes through a first one of the plurality of face apertures of the guide insert.

16. The method of claim 15, wherein a bottom surface of the guide insert includes a plurality of spaced apart ribs and the attaching the guide insert includes attaching the guide insert such that two of the ribs flank the actuator member such that the two ribs aid in linearly guiding the actuator member in response to the actuator member being moved from a first position to a second position.

17. The method of claim 13, wherein the second cover is the first cover and the method further comprises creating the drive-shaft aperture in the second cover.

18. A kit for retrofitting a load center to remotely control one or more circuit breakers installed in the load center, the kit comprising:

a replacement cover configured to be attached to a housing of the load center, the replacement cover including a preformed drive-shaft aperture therein;

a rotational motor including a threaded drive shaft, the rotational motor being configured to be attached to the replacement cover such that the threaded drive shaft is positioned through the preformed drive-shaft aperture in the replacement cover; and an actuator member configured to be threadingly engaged with the threaded drive shaft of the rotational motor, the actuator member having a handle aperture forming a first actuating surface and a second actuating surface in the actuating member.

19. The kit of claim 18, wherein the actuator member is configured to be oriented relative to the replacement cover such that a handle of one of the circuit breakers is positioned through the handle aperture of the actuating member when the replacement cover is attached to the housing of the load center.

20. The kit of claim 18, further comprising a guide insert configured to be attached to the replacement cover adjacent to the actuator member such that the guide insert is configured to substantially prevent rotation of the actuator member in response to the rotational motor rotating the threaded drive shaft.

* * * * *